(12) United States Patent
Dykman et al.

(10) Patent No.: US 12,393,434 B2
(45) Date of Patent: Aug. 19, 2025

(54) SYSTEM AND METHOD FOR SEGMENTING USERS OF A CLIENT APPLICATION

(71) Applicant: Skillz Platform Inc., San Francisco, CA (US)

(72) Inventors: Damien Simon Dykman, San Francisco, CA (US); Andrew Reynolds Meckel, San Francisco, CA (US); Samuel York Baker, San Francisco, CA (US); Adam Dustin Shapiro, Calabasas, CA (US); Shraddhaben A. Padariya, San Mateo, CA (US); Raghav Ramakrishnan, San Francisco, CA (US); Jonathan Lee, Burlingame, CA (US); Dean Xu Chen, San Francisco, CA (US); Philippe-Guillaume Victor David Losembe Botumbe, Venice, CA (US); Amber Dai Milavec, Portland, OR (US); Aharon Weisberg, Ridgefield, WA (US); Gabriel T. Schnaubelt, Beaverton, OR (US); Kevin Babb, Oakland, CA (US); Siddharth Shankar, San Francisco, CA (US); Zack Garbowitz, San francisco, CA (US)

(73) Assignee: Skillz Platform Inc., Las Vegas, NV (US)

( * ) Notice: Subject to any disclaimer, the term of this patent is extended or adjusted under 35 U.S.C. 154(b) by 15 days.

(21) Appl. No.: 18/465,970

(22) Filed: Sep. 12, 2023

(65) Prior Publication Data
US 2023/0418635 A1 Dec. 28, 2023

Related U.S. Application Data

(63) Continuation of application No. 17/663,100, filed on May 12, 2022, now Pat. No. 11,789,761.
(Continued)

(51) Int. Cl.
| | | |
|---|---|---|
| G06F 9/451 | (2018.01) | |
| G06F 11/30 | (2006.01) | |
| G06F 11/34 | (2006.01) | |

(52) U.S. Cl.
CPC ............ *G06F 9/453* (2018.02); *G06F 11/302* (2013.01); *G06F 11/3438* (2013.01)

(58) Field of Classification Search
CPC ...................................................... G06F 9/453
See application file for complete search history.

(56) References Cited

U.S. PATENT DOCUMENTS

2015/0301838 A1* 10/2015 Steeves ................ G06F 9/4446
2016/0062579 A1    3/2016 Lee
(Continued)

FOREIGN PATENT DOCUMENTS

WO     2022241451 A1    11/2022

*Primary Examiner* — James J Debrow
(74) *Attorney, Agent, or Firm* — Mintz, Levin, Cohn, Ferris, Glovsky and Popeo, P.C.

(57) ABSTRACT

In an aspect, first interaction data characterizing a first interaction of a user with a mobile device configured to operate an application client can be received. A plurality of segments of users of the application client can be determined, and each of the plurality of segments can be associated with one or more settings that characterize an operating parameter of the application client. The user can be assigned to a first segment of the determined plurality of segments based on a correspondence between a characteristic of the user and a characteristic associated with the first segment. The application client can be modified based on the (Continued)

one or more settings associated with the first segment. The modified application client can be provided for interaction by the user via the mobile device. Related systems, apparatus, techniques, and articles are also described.

20 Claims, 8 Drawing Sheets

Related U.S. Application Data

(60) Provisional application No. 63/240,549, filed on Sep. 3, 2021, provisional application No. 63/187,683, filed on May 12, 2021.

(56) References Cited

U.S. PATENT DOCUMENTS

| | | |
|---|---|---|
| 2018/0373547 A1 | 12/2018 | Dawes |
| 2019/0384686 A1* | 12/2019 | Estes et al. ......... G06F 11/3438 |
| 2020/0078685 A1* | 3/2020 | Aghdaie et al. ........ A63F 13/67 |
| 2021/0099541 A1* | 4/2021 | Konstantopoulos et al. ............... H04L 67/306 |
| 2022/0365797 A1 | 11/2022 | Dykman et al. |
| 2022/0382727 A1 | 12/2022 | Rao et al. |

\* cited by examiner

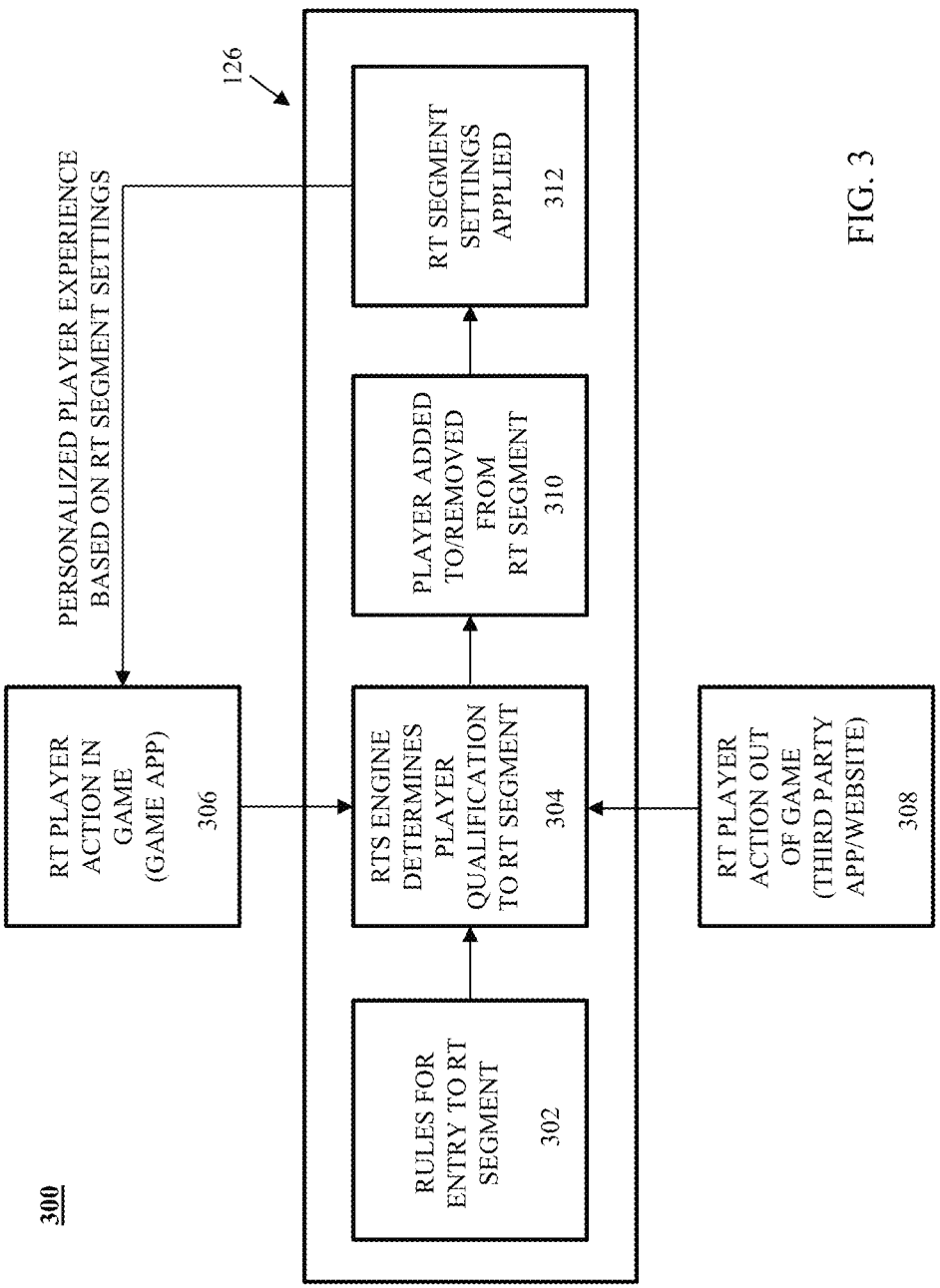

SYSTEM AND METHOD FOR SEGMENTING USERS OF A CLIENT APPLICATION

CROSS-REFERENCE TO RELATED APPLICATIONS

This application is a continuation of U.S. application Ser. No. 17/663,100, filed May 12, 2022, which claims the benefit of U.S. Provisional Application No. 63/240,549, filed Sep. 3, 2021, and U.S. Provisional Application No. 63/187,683, filed May 12, 2021, the contents of each of which are hereby incorporated by reference in their entirety.

BACKGROUND

Users of a client application can engage or otherwise interact with the client application in different ways depending on, for example, their level of skill or ability in and with the client application, how familiar each user is with operation and mechanics of the client application, and other like factors. A client application that provides the same experience for all users, regardless of their level of skill, ability, familiarity, and the like, can adversely affect each user's experience in the client application, which can lead to suboptimal user engagement and, ultimately, to user churn. For example, a client application that offers a novice user experience to all users may frustrate experienced users who are seeking to be challenged or who are expecting a more extensive experience in the client application. However, a client application that offers an advanced or challenging user experience to all users may frustrate novice users who are not yet capable of engaging with the client application beyond their basic level of skill or ability.

SUMMARY

Systems and methods for segmenting users of a client application are provided. Related apparatus, techniques, and articles are also described.

In an aspect, first interaction data characterizing a first interaction of a user with a mobile device configured to operate an application client can be received. A plurality of segments of users of the client application can be determined, and each of the plurality of segments can be associated with one or more settings that characterize an operating parameter of the application client. The user can be assigned to a first segment of the determined plurality of segments based on a correspondence between a characteristic of the user and a characteristic associated with the first segment. The application client can be modified based on the one or more settings associated with the first segment. The modified application client can be provided for interaction by the user via the mobile device.

One or more features can be included in any feasible combination. For example, second interaction data characterizing a second interaction of the user with the mobile device can be received, the user can be assigned to a second segment of the plurality of segments based on the received second interaction data, the modified application client can be modified based on the one or more settings associated with the second segment, and the further-modified application client can be provided for interaction by the user via the mobile device. For example, characteristic data characterizing a population of one or more users of the application client can be received, and one or more of the plurality of segments can be modified based on the received characteristic data. For example, the characteristic data can characterize an attribute, and the attribute can characterize one or more behaviors of the population. For example, the characteristic data can characterize a criterion, the criterion can characterize a comparison between the attribute and a predetermined threshold, and the predetermined threshold can be based on a type of the attribute. For example, a plurality of user identifications, for use with the application client, can be determined, one or more of the plurality of segments can be associated with each of the plurality of determined user identifications, an indication that a new user has installed the application client on a mobile device of the new user and initiated an interaction with the application client can be received, one of the plurality of user identifications can be assigned to the new user in response to the indication, the user can be assigned to the one or more of the plurality of segments associated with the user identification assigned to the new user, and the modified application can be based on the one or more settings associated with the one or more of the plurality of segments assigned to the new user. For example, the determination of the plurality of user identifications and the association of the one or more of the plurality of segments with each of the plurality of determined user identifications can occur prior to the receiving of the first interaction data. For example, the modifying of the application client can include modifying a graphical display of the application client. For example, each of the plurality of segments can include a priority classification, and the user can be assigned to the first segment based on the priority classification. For example, the providing of the further-modified application client can include determining a push notification characterizing the further-modified application client and causing the push notification to be transmitted to the mobile device of the user such that the mobile device is configured to operate the further-modified application client.

In another aspect, a system is provided and can include at least one data processor and memory storing instructions configured to cause the at least one data processor to perform operations described herein. The operations can include receiving first interaction data characterizing a first interaction of a user with a mobile device, the mobile device configured to operate an application client; determining a plurality of segments of users of the application client, each of the plurality of segments being associated with one or more settings that characterize an operating parameter of the application client; assigning the user to a first segment of the determined plurality of segments based on a correspondence between a characteristic of the user and a characteristic associated with the first segment; modifying the application client based on the one or more settings associated with the first segment; and providing the modified application client for interaction by the user via the mobile device.

One or more features can be included in any feasible combination. For example, the operations can further include receiving second interaction data characterizing a second interaction of the user with the mobile device; assigning the user to a second segment of the plurality of segments based on the received second interaction data; modifying the modified application client based on the one or more settings associated with the second segment; and providing the further-modified application client for interaction by the user via the mobile device. For example, the operations can further include receiving characteristic data characterizing a population of one or more users of the application client; and modifying one or more of the plurality of segments based on the received characteristic data. For example, the characteristic data can characterize an attribute, and the attribute can characterize one or more behaviors of the population. For example, the characteristic data can characterize a criterion, the criterion can characterize a comparison between the attribute and a predetermined threshold, and the predetermined threshold can be based on a type of the attribute. For example, the operations can further include determining a plurality of user identifications for use with the application client; associating one or more of the plurality of segments with each of the plurality of determined user identifications; receiving an indication that a new user has installed the application client on a mobile device of the new user and initiated an interaction with the application client; assigning, in response to the indication, one of the plurality of user identifications to the new user; and assigning the user to the one or more of the plurality of segments associated with the user identification assigned to the new user, and the modified application client can be based on the one or more settings associated with the one or more of the plurality of segments assigned to the new user. For example, the determining of the plurality of user identifications and the associating of the one or more of the plurality of segments with each of the plurality of determined user identifications can occur prior to the receiving of the first interaction data. For example, the modifying of the application client can include modifying a graphical display of the application client. For example, each of the plurality of segments can include a priority classification, and the user can be assigned to the first segment based on the priority classification.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g. the Internet, a wireless wide area network, a local area network, a wide area network, a wired network, or the like), via a direct connection between one or more of the multiple computing systems, etc.

BRIEF DESCRIPTION OF THE DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 3 is a block diagram illustrating operation of a real-time segmentation engine to personalize the experience of players of a mobile game;

DETAILED DESCRIPTION

Figure 1:
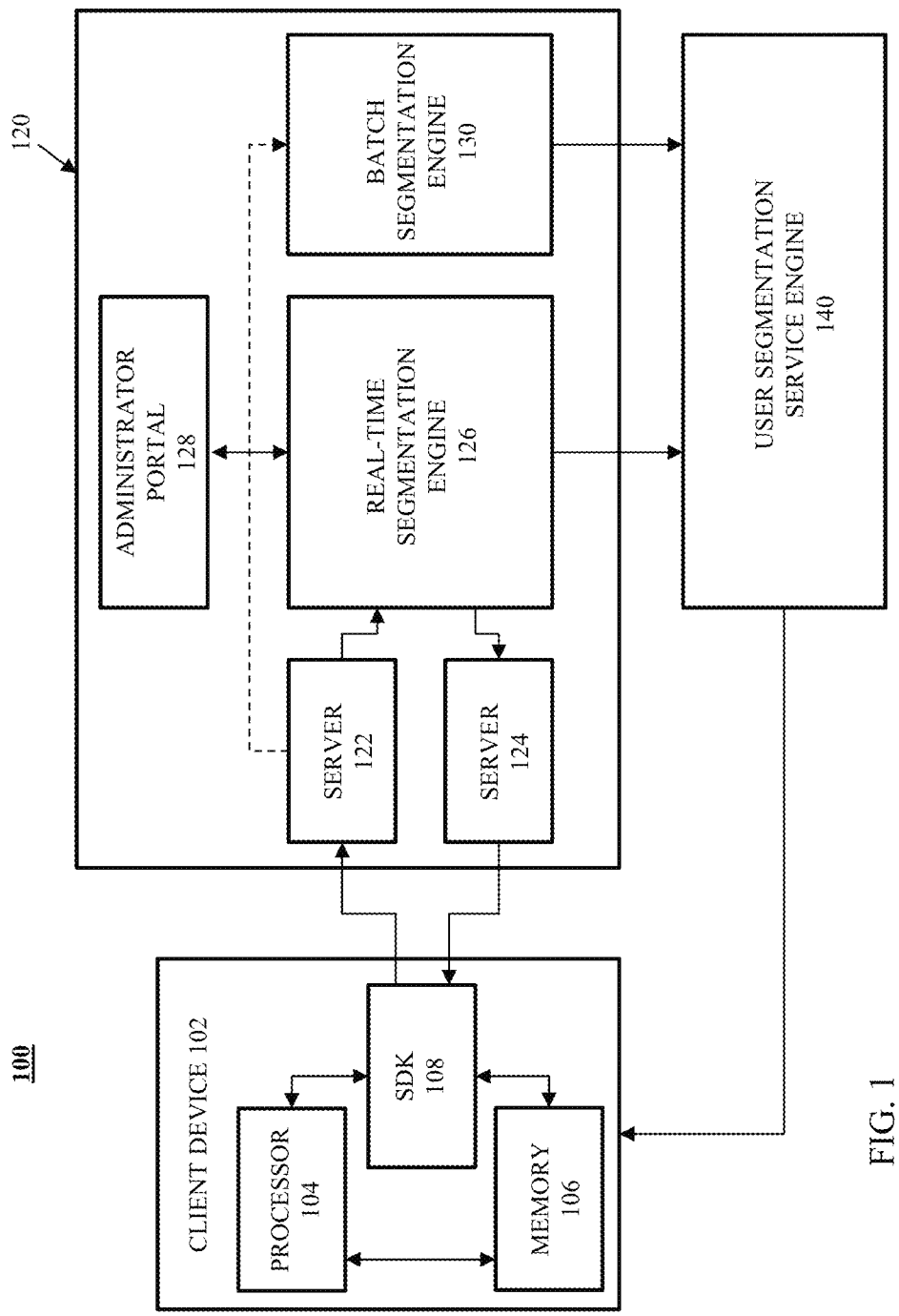
FIG. 1 is a block diagram illustrating an example system for real-time segmentation of users of a client application.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Some implementations of the system and method of the present invention can be directed to pre-segmentation of users of a client application. According to some implementations of the present invention, segmentation can be used to personalize the experience for each user of a client application by creating groups or cohorts or segments of users from the user population that share common behaviors, characteristics, and the like. The client application experience can be tailored for users in each segment. To optimize the initial onboarding experience for new users in the client application, future users can be pre-segmented into one or more pre-generated segments prior to installing and using the client application. Once a new user installs and begins interacting with the client application, the new user can be immediately (or soon thereafter) assigned to one or more of the pre-generated segments and be presented with personalized onboarding that improves their initial engagement with the client application. Thus, each segment can be associated with a different user experience in the client application. Some implementations of the present invention can therefore result in an improved customized experience for each user of the client application.

After being assigned to one or more of the pre-generated segments, a user can generate an event when they further interact or otherwise engage with the client application. A real-time segmentation system can react to the user event by moving the user into or out of one or more real-time segments to provide a customized user experience within the client application in real-time. Consequently, users with similar behaviors, characteristics, and the like can share an experience in the client application that is similar or identical to other users in the real-time segment. Users can belong to one or more real-time segments. The event-driven user activity can be used to segment the users in real-time so that each user's experience in the client application can be updated as the user generates events in or otherwise interacts or engages with the client application. The real-time segmentation system can react based on the context of the user's actions, such as, for example, the location of the user, progress of the user in or with the client application, and the like. Such stateful event processing can be used by the real-time segmentation system to react in real-time to events with context as they occur within the client application, particularly where the events may be transient in nature (e.g., a short win streak in a mobile game) and a quick response is desirable.

As such, some implementations of the present invention can allow for modification and/or dynamic updating of client and server configuration parameters (e.g., system settings), which can enable dynamic and flexible control of client application operation. As such, some implementations of the present invention can provide for a better overall system experience. Additionally, some implementations of the present invention can improve the efficiency and utilization of computer processing and memory by grouping users into segments so that personalization or customization of the user experience can be managed at the segment level for large numbers of users, rather than managing the user experience for each user individually. Without grouping users into segments, managing individual user experiences would be practically impossible for client applications with, for instance, millions or tens of millions of users. For example, each segment can be comprised of a software component executing on computer hardware resources. Grouping users into segments can enable the same computer hardware resources (e.g., computer processing and memory) to be used for a large number of users (e.g., hundreds of thousands, millions, tens of millions, etc.), resulting in significant optimization of computer resource utilization. In some implementations of the present invention, pre-segmenting users can be less computer resource intensive than segmenting users in real-time (e.g., since a default user experience of future users can be pre-computed rather than performed on-the-fly). Thus, by pre-segmenting users, the efficiency and utilization of computer processing and memory can be improved dramatically, particularly for client applications with large or very large numbers of users.

Merely for purposes of discussion and not limitation, the present disclosure will refer to mobile games as an exemplary client application to illustrate various aspects of the present invention. The mobile game can be or include, for example, a sports game, an adventure game, a virtual playing card game, a virtual board game, a puzzle game, a racing game, or any other appropriate type of mobile game. In an embodiment, the mobile game can be an asynchronous competitive skill-based game, in which players can compete each against other in the mobile game, but do not have to play the mobile game at the same time. In an alternative embodiment, the mobile game can be a synchronous competitive skill-based game, in which players can play the mobile game at the same time and can compete against each other in the mobile game in real-time. Other suitable mobile games are possible. However, some implementations of the present invention can be used in and with any suitable type of client application in which the user experience can be tailored or customized for users. The client application can relate to and/or provide a wide variety of functions and information, including, for example, entertainment (e.g., a game, music, videos, etc.), business (e.g., word processing, accounting, spreadsheets, etc.), news, weather, finance, sports, etc.

FIG. 1 is a block diagram illustrating an example system 100 for real-time segmentation of users of a client application, in accordance with embodiments of the disclosure that can provide for dynamic and flexible control of client application operations in real-time. In the present disclosure, "real-time" refers to the processing of events or other data instantaneously or within a relatively short period of time (e.g., seconds, minutes) so that there are minimal delays between when information is received and when the information is processed and the results provided. As discussed previously, segmentation can include the personalization of experiences for a user of the client application (e.g., a player in a mobile game) by creating groups or cohorts or segments of users from the user population that share common user behavior and/or other suitable characteristics. Segmentation can also include experimentation, such as the ability to randomize users within groups. For example, event-driven player activity (e.g., signing up, playing the game, deposit funds, etc. in the context of mobile games) can be used to drive segmentation in real-time. An event can be any action that a player takes in the mobile game (e.g., played a game, won a game, deposited cash, and the like) or the result or outcome of any action the player takes in the mobile game (e.g., won 10 games in a row, lost 10 games in a row, and the like).

As shown in FIG. 1, each user can play a mobile game on a suitable client device 102 (e.g., smartphone, tablet, laptop computer, and the like, although any suitable electronic device can be used). The client device 102 can include a processor 104 for executing instructions for the mobile game stored in a memory 106. In an embodiment, a software development kit (SDK) 108 for the mobile game can reside in the memory 106 and be executed by the processor 104. The SDK 108 can be comprised of a set of instructions for executing the mobile game and can provide an interface through which the mobile game on the client device 102 can communicate with the server system 120, such as in-game player action information communicated from the mobile game as the user interacts or otherwise engages with the mobile game. In embodiments, the player action can occur outside of the mobile game. For example, such out-of-game player activity can include an ad click or other like activity outside of the mobile game. Thus, player activity can be any suitable type of in-game or out-of-game information that is associated with actions, events, or other interactions generated by the player. The player activity from the mobile game can be passed by the SDK 108 to the server system 120 via a first server 122. The first server 122 can be any suitable type of server that is capable of ingesting information in real-time (e.g., Apache Kafka, which is an open-source distributed event streaming platform for high-performance data pipelines). The player activity received by the first server 122 can be passed to the real-time segmentation engine 126.

The real-time segmentation engine 126 can receive the player activity to determine whether a player should be added to a segment, removed from a segment, or no action is necessary. The real-time segmentation engine 126 can include hardware (e.g., processing device, circuitry, dedicated logic, programmable logic, microcode, hardware of a device, integrated circuit, etc.), software (e.g., instructions run or executed on a processing device), or a combination thereof. For example, in an embodiment, the real-time segmentation engine 126 can use or otherwise be based on Apache Flink, which is a framework and distributed processing engine for real-time stateful computations at large scale for unbounded and bounded data streams. In embodiments, segments can be predefined or generated dynamically, can be static or can change dynamically, can be of any suitable size (e.g., can be comprised of any appropriate number of players), and can each be associated with one or more player characteristics, behaviors, or the like. The segments can be generated or changed dynamically as, for example, the characteristics, behaviors, and the like of players change to better address an evolving player population. Suitable machine learning/artificial intelligence techniques can be used to dynamically generate or change segments. For example, a machine learning model can be trained based on historical data from all players in the mobile game. The machine learning model can then be used to dynamically generate or change segments based on shared characteristics, behaviors, and the like of subsets of the player population. The machine learning model can be updated or otherwise adapted as the characteristics, behaviors, and the like of players evolve over time.

Segments can be defined using any suitable type of computer language or grammar, such as SQL queries or the like. In an embodiment, a domain specific language (DSL) for segmentation can be a grammar that can be used to define segments. Using DSL, a segment can be defined as a group of users that satisfy one or more attributes meeting specified criteria. The DSL can be comprised of several components, such as attributes, criteria, and combinational logic. In an embodiment, attributes can be a set of possible player/server behaviors (e.g., login platform, server location, deposits, etc.). Attributes can be comprised of core attributes, which can be a fundamental list of attributes that are used for a majority of segmentation use cases, and non-core attributes, which can be an extended list of attributes that are used for "edge-case" segmentation use cases and the like. In an embodiment, an attribute can have an attribute type, such as qualitative or quantitative. A qualitative type can be a categorical variable, such as a country code, user ID, or the like. A quantitative type can be a numerical variable, such as a deposit sum, login count, or the like. Other attribute types are possible. In an embodiment, a criteria can be a comparison between the value of the attribute in question and a defined threshold that can vary based on the attribute type. For example, for a comparison of "equal to", such as "platform=iOS," the criteria can be both qualitative and quantitative. For a comparison of "greater than," such as "deposits >$100," the criteria can be quantitative but not qualitative. For a comparison of "wildcard," such as "win sequence=XX %," the criteria can be qualitative but not quantitative. Other criteria are possible. In an embodiment, the combinational logic can be boolean logic to combine attributes and criteria. For example, an "OR" operator (e.g., which is true when either A or B is satisfied) can be used, such as "country=US OR platform=iOS." For instance, an "AND" operator (e.g., which is true when both A and B are satisfied) can be used, such as "daily deposit >$25 AND daily prize <$25." Other types of combinational logic can be used. In some embodiments, a segment entry probability can also be specified, for example, for use in A/B testing or the like for randomized experimentation with segments. A segment entry probability can be the percentage chance that a player satisfying segment criteria will be added to the segment.

According to some implementations of the present invention, the DSL can support flexibility in segment creation by using a combination of attributes and criteria. Table 1 illustrates how segments can be more easily defined using DSL instead of based on, for example, SQL queries.

TABLE 1

Comparison of Segment Definition in SQL to Segment Definition in DSL

| Segment Description | Segment Definition in SQL | Segment Definition in DSL |
| --- | --- | --- |
| Users for whom the first installed game from a list of games | with user game rank as ( Select ga.user_id,ga.game_id, ga.date_created,row_number( ) over (partition by ga.user_id order by ga.date_created) as install_rank from company.game_account ga ) select ugr.user_id from user_game_rank ugr inner join company.tournament_player tp on tp.user_id = ugr.user_id where true and ugr.install_rank = 1 and ugr.game_id in (3159, 295, 5010, 1894, 4113, 2044, 3888, 2763, 2026, 1877, 1917, 2940, 2922, 2755, 3889) group by 1 order by max(tp.date_created) desc limit 1000000 | First game installed in Time period = Lifetime is = [Game 1] OR First game installed in Time period = Lifetime is = [Game 2] OR First game installed in Time period = Lifetime is = [Game 3] OR ... |

Figure 2:
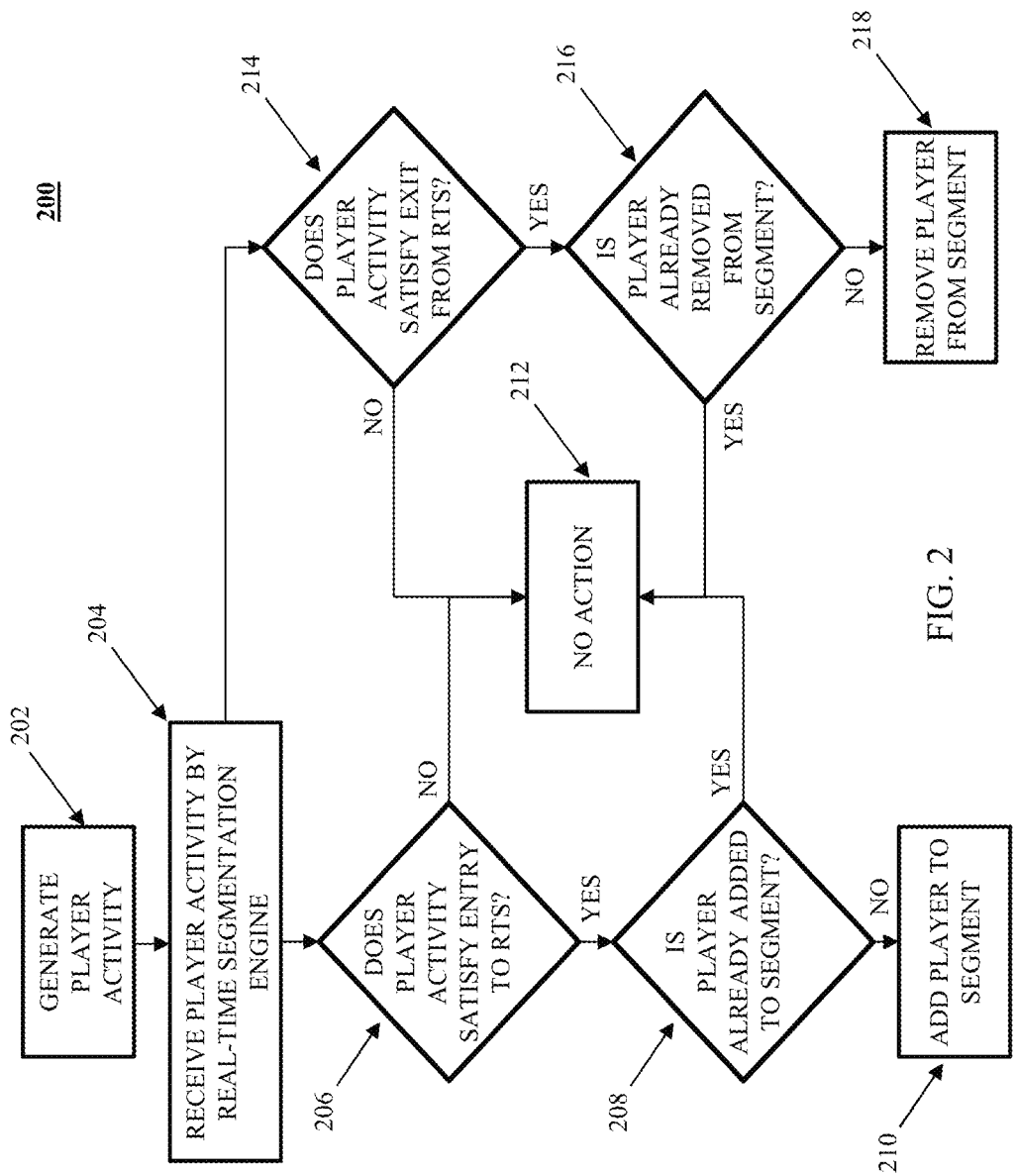
FIG. 2 is a flowchart of an example method of segmenting users of a client application in real-time.

FIG. 2 is a block diagram illustrating an example method 200 of segmenting users of a client application in real-time, in accordance with embodiments of the disclosure. At block 202, player activity can be generated, such as by a player interacting with a mobile game executing on client device 102 of FIG. 1. At block 204, the real-time segmentation engine 126 can receive the generated player activity (e.g., via first server 122 from the SDK 108). In embodiments, the received player activity can satisfy either entry to or exit from one or more segments. At block 206, the real-time segmentation engine 126 can make a determination whether the player activity satisfies entry to one or more segments (where "RTS" in FIG. 2 is an abbreviation for "real-time segment"). Since each segment can be defined according to one or more attributes, the real-time segmentation engine 126 can compare the attributes of the player with the attributes defined for the segment(s) to determine whether the player activity satisfies entry to the segment(s). At block 206, if the real-time segmentation engine 126 determines that the player activity does not satisfy entry to one or more segments, then the real-time segmentation engine 126 can take no action with respect to the player at block 212. At block 206, if the real-time segmentation engine 126 determines that the player activity satisfies entry to one or more segments, then at block 208, the real-time segmentation engine 126 can determine whether the player is already added to the one or more segments. In an embodiment, a player can satisfy the entry condition(s) for one or more segments one or more times. However, a player can be added to the one or more segments the first time the player satisfies the entry condition(s) to the one or more segments. If the real-time segmentation engine 126 determines that the player is already added to the one or more segments, then the real-time segmentation engine 126 can take no action with respect to the player at block 212. However, if the real-time segmentation engine 126 determines that the player is not already added to the one or more segments, then the real-time segmentation engine 126 can add the player to the segment(s) at block 210. For purposes of illustration and not limitation, an example attribute-based definition for a segment can be specified as in Equation (1):

$$\text{Segment } A = [\text{winning streak}][\text{is}=][20] \qquad (1)$$

According to Equation (1), if the player activity is such that the player just had a winning streak equal to 20 games, then the player can be added to Segment A. More complex segment definitions are possible, as segment definitions can comprise any suitable combination of one or more attributes and/or criteria. For example, Equation (2) is a combination of several attributes:

$$\text{Segment } B = [\text{Lifetime spend}][\text{is}>][\$50] \text{ AND}[\text{winning streak}][\text{is}=][20] \qquad (2)$$

According to Equation (2), if the player activity is such that the player's lifetime spend just became greater than $50 and the player just had a winning streak equal to 20 games, then the player can be added to Segment B. Note that the player could be added to both Segment A and Segment B, since the player satisfies both definitions in these examples. Other segment definitions are possible.

At block 214, the real-time segmentation engine 126 can make a determination whether the player activity satisfies exit from one or more segments. Since each segment can be defined according to one or more attributes, the real-time segmentation engine 126 can compare the attributes of the player with the attributes defined for the segment(s) to determine whether the player activity satisfies exit from the segment(s). At block 214, if the real-time segmentation engine 126 determines that the player activity does not satisfy exit from one or more segments (e.g., the player activity still satisfies the definition of the one or more segments), then the real-time segmentation engine 126 can take no action with respect to the player at block 212. At block 214, if the real-time segmentation engine 126 determines that the player activity satisfies exit from one or more segments, then at block 216, the real-time segmentation engine 126 can determine whether the player is already removed from the one or more segments. In an embodiment, a player can satisfy the exit condition(s) for one or more segments one or more times. However, a player can be removed from the one or more segments the first time the player satisfies the exit condition(s) from the one or more segments. If the real-time segmentation engine 126 determines that the player is already removed from the one or more segments, then the real-time segmentation engine 126 can take no action with respect to the player at block 212. However, if the real-time segmentation engine 126 determines that the player is not already removed from the one or more segments, then the real-time segmentation engine 126 can remove the player from the segment at block 218. For purposes of illustration and not limitation, a player was previously added to Segment A based on satisfying the segment definition of Equation (1). The player has been in Segment A for a period of time. The player then generates player activity indicating that their winning streak has increased to 21 games. The real-time segmentation engine 126 can compare the attributes of the player (winning streak of 21 games) to the segment definition of Equation (1) (i.e., a winning streak equal to 20 games). Since the player's winning streak is no longer equal to 20 games, the player activity satisfies exit from the segment. Consequently, the real-time segmentation engine 126 can remove the player from Segment A.

According to some implementations of the present invention, as players enter and exit segments in real-time, the player experience in or associated with the mobile game can be updated or otherwise personalized to the player in real-time. FIG. 3 is a block diagram illustrating the operation 300 of the real-time segmentation engine 126 to personalize the experience of players of the mobile game, in accordance with embodiments of the disclosure. At block 302, the rules for entry to/exit from one or more real-time segments can be defined or otherwise generated. These rules, such as the definition of attributes of each real-time segment or the like, can be used by the real-time segmentation engine 126 at block 304 to determine whether a player qualifies for entry to/exit from one or more real-time segments. The rules can be predefined or otherwise specified by, for example, a system administrator via an administrator portal 128 of FIG. 1 (discussed in more detail below). At block 306, one or more real-time player actions can occur in the mobile game. These in-game events can be passed to real-time segmentation engine 126 at block 304. Additionally or alternatively, at block 308, one or more real-time player actions can occur outside of the mobile game, such as through a third party application, a website, or the like. These out-of-game events can be passed to the real-time segmentation engine 126 at block 304 (e.g., via Apache Kafka, a distributed stream processing engine for building real-time data pipelines and streaming applications). Based on the events received from either or both of blocks 306 and 308 and the segment rules from block 302, the player can be added to or removed from the real-time segment in block 310 by the real-time segmentation engine 126. The segment settings associated with the segment(s) for personalizing the player experience can be applied at block 312. A personalized player experience based on the real-time segment settings from block 312 can be applied to the mobile game application running on the player's client device at block 306 to generate a tailored or customized experience for the player of the mobile game.

Any suitable aspect of the player experience in or associated with the mobile game can be updated, customized, modified, or otherwise personalized for the player based on the segment to which the player is added. For example, the real-time segmentation engine 126 can personalize any or all aspects of the graphical display of the mobile game (e.g., one or more graphical elements of the mobile game, such as any aspect of the "look and feel" of the graphical interface displayed by the mobile game), the information displayed within the mobile game, the features and functionality of the mobile games, and the like. Merely for purposes of illustration and not limitation, the real-time segmentation engine 126 can personalize the graphical display of the mobile game to display, for example, player incentives, special offers, advertisements or the like to the player inside or within the mobile game. In embodiments, different player incentives, special offers, advertisements, or the like can be displayed to a player in the mobile game based on the segment(s) to which the player is added. Additionally or alternatively, the real-time segmentation engine 126 can personalize, for example, prizes, rewards, and/or gifts displayed or presented to the player in an associated gift store. For example, a player in one segment may be presented with prizes/rewards/gifts that are different from prizes/rewards/gifts that may be presented to another player in another segment. In this manner, the menu or list of prizes, rewards, and/or gifts can be tailored to each or any player in the associated gift store displayed in the mobile game. Additionally or alternatively, the real-time segmentation engine 126 can personalize, for example, graphical information displayed to the user outside of the mobile game, such as ads or offers surfaced to the player on their client device outside of the mobile game. Other personalizations are possible. The types of personalization can be specified as part of the definition or associated settings of each or any segment.

For purposes of illustration and not limitation, a first example segment can be based on a game winning or losing streak of a predetermined number of games, such as a player who won or lost 10 overall games in a row in 24 hours. The segment personalization settings can be, for example, a special limited-time offer (LTO) or a new tournament template (e.g., a specialized competition in a skill-based mobile game that can provide a more or less challenging competition for the player). Thus, as soon as the player achieves 10 overall games lost (the player action or event), the real-time segmentation engine 126 can determine that the player qualifies for entry to the first segment. Once entered into the first segment, the real-time segmentation engine 126 can cause the segment personalization settings to be applied to the mobile game of the player via a second server 124 (e.g., Apache Kafka, which is an open-source distributed event streaming platform for high-performance data pipelines) and SDK 108. For example, the special LTO can be displayed to the player (either inside or outside the mobile game) or the new tournament template can be provided within the game by modifying the display of the mobile game to allow the player to compete in a special tournament that may be less challenging to the player.

As another illustration, a second example segment can be based on a player installing a second game from a particular developer. The segment personalization settings can be, for example, a special display of information to the player that explains the cross-system collaboration and prizes within and across the developer's games. Thus, as soon as the player installs the second game from the developer (the player action or event), the real-time segmentation engine 126 can determine that the player qualifies for entry to the second segment. Once entered into the second segment, the real-time segmentation engine 126 can cause the segment personalization settings to be applied to the mobile game of the player. For example, the special information can be displayed to the player within the mobile game by modifying the display of the game to present the special information to the player. According to some implementations of the present invention, once the player exits the segment (in response to a suitable player action), the real-time segmentation engine 126 can cause the segment personalization settings to be removed from the mobile game of the player or new segment personalization settings to be applied to the mobile game of the player via second server 124 and SDK 108, depending on the settings specified for the segment. In an embodiment, a player can be retained in a segment until the player no longer qualifies for the segment (and is removed from the segment). In another embodiment, the player can be retained in the segment for a predetermined maximum amount of time (e.g., minutes, hours, days) once the player has qualified for entry to the segment, if not removed earlier due to player activity qualifying for the segment removal criteria.

As a further illustration, a third example segment can have the following segment entry conditions: an ad came from a social media platform; the player is based in the USA; the user installs a mobile game; and the player plays their first game within the first day. The segment personalization settings associated with the third segment can include an immediate display of a LTO to the player upon entry to the segment. The segment exit condition can be that the player takes the LTO. Thus, if a first player clicks on the mobile game ad, and the ad came from the social media platform, the first player is based in the USA, the first player installs the game, and the first player plays their first game within 1 day, then the first player can be added to the third segment and the LTO is immediately displayed to the first player. If the first player takes the LTO (i.e., accepts the offer), the first player can exit the segment and the LTO can be hidden or otherwise removed from the display.

Figure 4A:
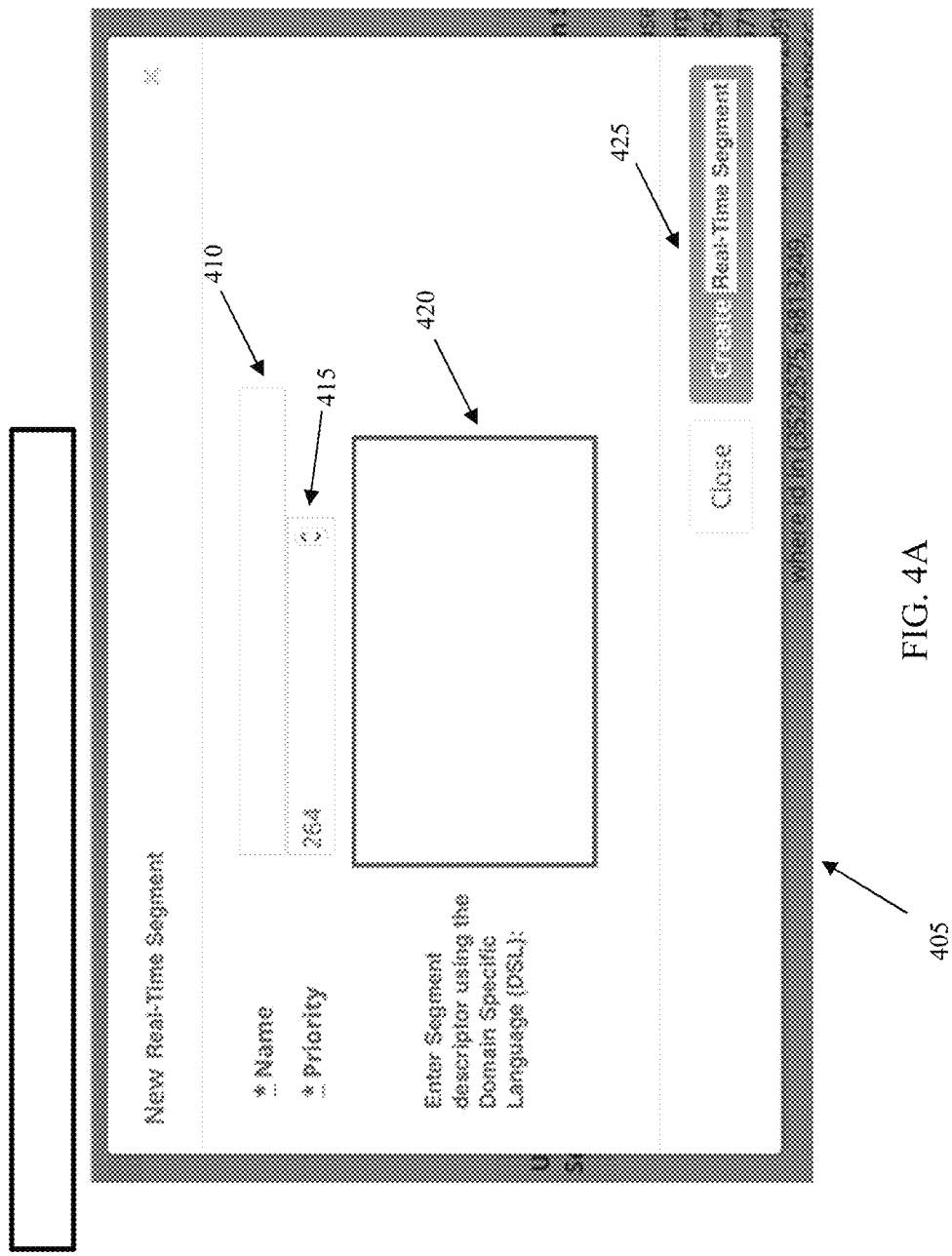
FIG. 4A is an illustration of a graphical user interface for specifying a new real-time segment.
Figure 4B:
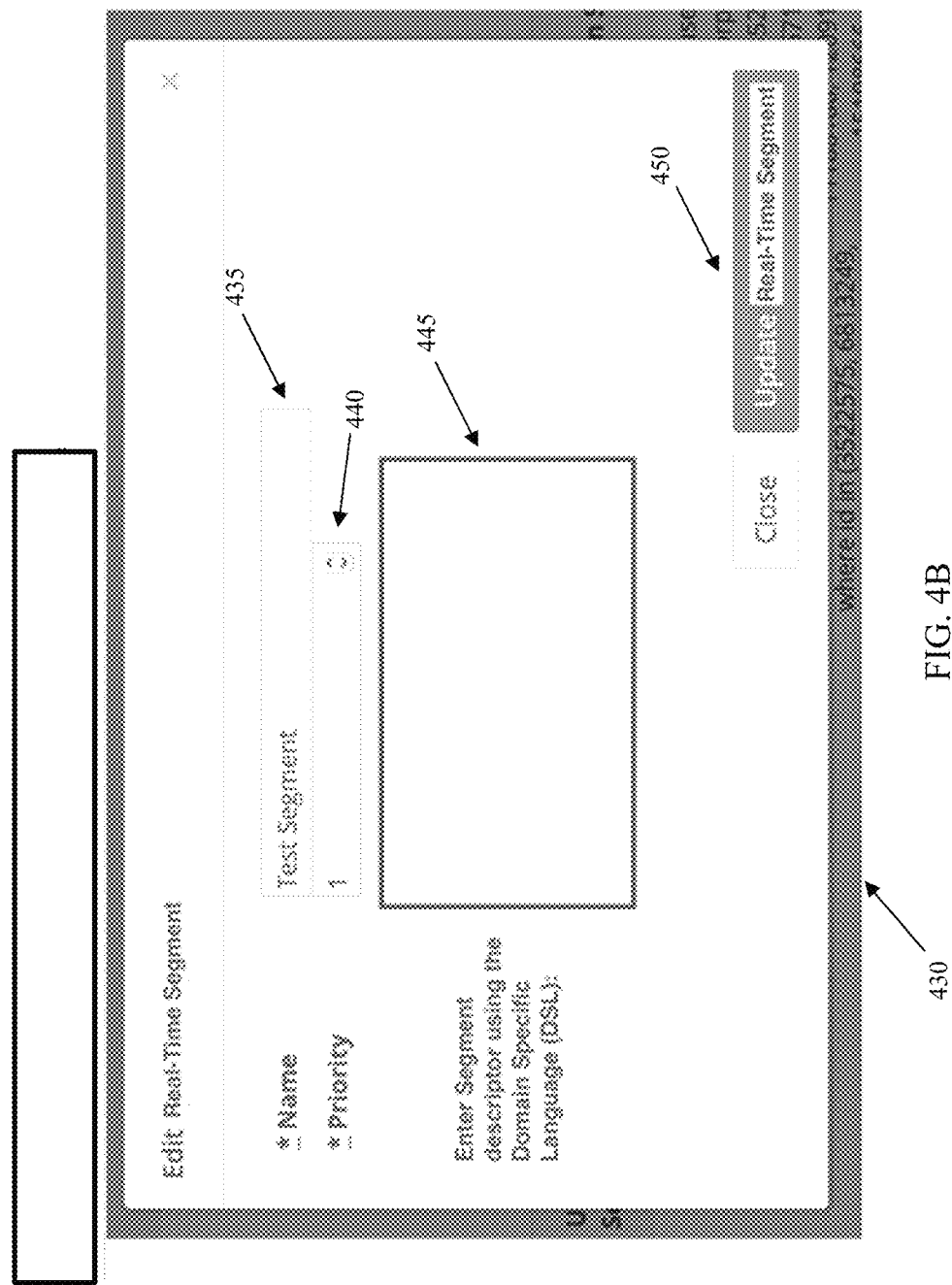
FIG. 4B is an illustration of a graphical user interface for editing an existing real-time segment.

The definitions, rules, attributes, and segment personalization settings for each segment can be specified in any suitable manner. In an embodiment, a management or administrator portal 128 of FIG. 1 can be used to specify any or all aspects of each segment. The administrator portal 128 can be a suitable graphical user interface through which a manager or administrator of the server system 120 can specify the segment definitions. For example, FIG. 4A is an illustration of a graphical user interface (GUI) 405 for specifying a new real-time segment. The GUI 405 can include a name field 410, a priority field 415, and a segment descriptor field 420. Additional and/or alternative fields are possible. The name field 410 can be used to enter the name of the real-time segment. The priority field 415 can be used to specify the priority of a real-time segment, as real-time segments can have priorities associated with them. In an embodiment, a player can qualify for entry to more than one real-time segment, where at least two of those segments share one or more characteristics. In an embodiment, the player can be assigned to the real-time segment associated with the highest priority. For example, certain personalizations or customizations for a player may be applied to a higher-priority segment (e.g., the highest-priority segment or segments with a priority above a certain threshold) and not to lower-priority segments. Additionally or alternatively, real-time segments can be applied in a prioritized order for a player, if desired, such as when a player qualifies for entry to two or more real-time segments. In an alternative embodiment, the priority can be used to determine which personalizations or customizations from multiple segments are displayed to the player. For example, if a player is assigned to multiple segments, each having different values set for a certain characteristic, the characteristic from the highest priority segment can be displayed to the player. For purposes of illustration and not limitation, if a player is assigned to three different segments, each of which sets a custom value for the color of a certain button, the button color associated with the highest-priority segment can be displayed to the player. Alternatively, if a player qualifies for entry to multiple real-time segments that do not share one or more characteristics, then the player can be assigned to each of those multiple segments without prioritizing any segment. The segment descriptor field 420 can be used to enter the real-time segment definition or description using, for example, the DSL, as discussed above. Once the information has been entered, the administrator can create the new real-time segment by pressing the create button 425. Once created, the information associated with the new real-time segment can be passed to the real-time segmentation engine 126 for use in segmenting players. For example, FIG. 4B is an illustration of a GUI 430 for editing an existing real-time segment. The GUI 430 can include a name field 435, a priority field 440, and a segment descriptor field 445. Additional and/or alternative fields are possible. The name field 435 can be used to enter the name of the real-time segment to be updated. The priority field 415 can be used to specify or update the priority of a real-time segment. The segment descriptor field 420 can be used to update the real-time segment definition or description using, for example, the DSL, as discussed above. Once the information has been entered, the administrator can update the real-time segment by pressing the update button 450. Once updated, the information associated with the updated real-time segment can be passed to the real-time segmentation engine 126 for use in updating the segmentation of players.

As discussed previously, the real-time segmentation engine 126 can be used to personalize the player experience within or associated with a mobile game in real-time based on event-driven player activity. In addition to the real-time processing, a batch segmentation engine 130 of FIG. 1 can be used to manage segments whose criteria are triggered based on a player state, and can be computed through an offline batch process that can extend into hours or days as opposed to in real-time. A player state can be the aggregate of player events over a specified time period, such as, for example, the games played in lifetime, games won in last 180 days, total cash deposited in 120 days, or the like. The batch segmentation engine 130 can include hardware (e.g., processing device, circuitry, dedicated logic, programmable logic, microcode, hardware of a device, integrated circuit, etc.), software (e.g., instructions run or executed on a processing device), or a combination thereof. For example, in an embodiment, the batch segmentation engine 130 can use or otherwise be based on Snowflake (a cloud-based data warehouse for storing and analyzing data) or any other suitable database. The batch segmentation engine 130 can receive the same information as the real-time segmentation engine 126 (e.g., via the first server 122) and process the information in parallel or otherwise in conjunction with the real-time segmentation engine 126 (albeit as a slower batch process). Segments for batch processing can be defined using any suitable type of computer language or grammar, such as DSL, SQL queries or the like. In an embodiment, the segments for the batch segmentation engine 130 can be specified in the same manner as discussed previously with respect to the real-time segmentation engine 126 (e.g., via administrator portal 128). Thus, the segments for the batch segmentation engine 130 can use the same or similar DSL language or grammar and can be specified using same or similar components, such as attributes, criteria, rules, and combinational logic, discussed previously for the real-time segmentation engine 126. For example, a batch segment can be defined as players who have spent more than $100 in any 90-day period. Other segment definitions for the batch segmentation engine 130 are possible.

According to some implementations of the present invention, segments can be processed as a real-time process, as a batch process, or as a combination of real-time and batch processes. For example, a segment can be triggered either when an offline player state (e.g., players who have spent more than $100 in any 90-day period) OR a real-time player activity or event (e.g., players who just had a 20-game winning streak) is satisfied. In an embodiment, segments can be triggered with criteria based on a combination of an offline player state and a real-time player activity or event when both criteria are satisfied. For purposes of illustration and not limitation, the combined criteria for a segment can be players who have spent more than $100 in any 90-day period AND who just had a 20-game winning streak. Once triggered and the player enters the segment, the server system 120 can personalize the player experience for the player of the mobile game using the segment personalization settings specified for that segment.

In an embodiment, the segment personalization settings from the real-time and batch processes of real-time segmentation engine 126 and batch segmentation engine 130, respectively, can be applied to the mobile game of the player by a user segmentation service (USS) engine 140 illustrated in FIG. 1. The USS engine 140 can include hardware (e.g., processing device, circuitry, dedicated logic, programmable logic, microcode, hardware of a device, integrated circuit, etc.), software (e.g., instructions run or executed on a processing device), or a combination thereof. For example, in an embodiment, the USS engine 140 can use or otherwise be deployed on Kubernetes, which is an open-source container-orchestration system for automating computer application deployment, scaling, and management. The USS engine 140 can receive the appropriate segment settings from the real-time segmentation engine 126 and/or the batch segmentation engine 130 and output segment personalization or customization information to update or otherwise modify the player experience in or associated with a mobile game on the player's client device. The USS engine 140 can consolidate the output of the real-time segmentation engine 126 and the batch segmentation engine 130 to manage segment entries and exits, where a segment can be either a real-time segment or a batch segment. For example, the real-time segmentation engine 126 and the batch segmentation engine 130 can pass player-segment mapping information to the USS engine 140 that can be used to map a player ID to a particular segment ID specified in the segment definition. In an embodiment, the player-segment mapping information can be comprised of player-segment key value pairs (e.g., player ID, segment ID), although additional and/or alternative information can be included in the player-segment mapping information (e.g., attribution, player location, and the like). In an additional embodiment, a time to live (TTL) can be assigned to any or all of the player-segment mappings to allow segment mappings (and, therefore, segments) to expire after a predetermined time interval specified by the TTL.

According to an embodiment of the present invention, the USS engine 140 can support push notification services to push personalization updates to the client devices of players to customize or otherwise personalize the mobile game experience of the players based on entry to or exit from segments. However, the USS engine 140 can support any suitable type of technique or mechanism that is capable of updating, customizing, personalizing, modifying, or otherwise configuring the player experience in or associated with the mobile game. For purposes of illustration and not limitation, the USS engine 140 can support LTO push notifications and triggered push notifications. In an embodiment, the USS engine 140 can send an Amazon Simple Queue Service (SQS) message to a suitable push notification service, which can ingest such messages and send the LTO or triggered push notifications out to the client devices of the players. SQS is a fully managed message queueing service that enables users to decouple and scale microservices, distributed systems, and serverless applications. For example, players that enter a segment associated with a new LTO can receive a LTO push notification at their client device that informs them that they have an LTO available. In an embodiment, each LTO can be associated with a marketing campaign. If a player enters a segment associated with a LTO, the USS engine 140 can perform a lookup or retrieval (from an appropriate database or distributed cache, such as Redis or the like) of the LTO and marketing campaign associated with the LTO (e.g., to ensure that the LTO and associated marketing campaign exist). The USS engine 140 can also perform a lookup or retrieval of the profile of the player that entered the segment. The USS engine 140 can then set a game ID to the mobile game being played by the player or any other appropriate mobile game (e.g., the most-played mobile game of the day, week, month, etc.). Based on the retrieved information and game ID, the USS engine 140 can build an appropriate push message for the player for the LTO. The USS engine 140 can identify or otherwise determine the push notification service or other push provider to deliver the message, and then use the identified service to send the LTO push notification to the client device of the player. Once received by the client device, the LTO push notification can be configured to update the client device to display the LTO to the player (e.g., either in or outside the mobile game executing on the client device). Other types of push notifications are possible.

In an embodiment, a triggered push notification can be a push of personalized information to a player that is triggered by an event from the player. A triggered push notification can be used to determine which player(s) included in the trigger should receive a push based on the segments to which the player(s) belongs. For example, a triggered push notification can be used to personalize any or multiple segments to which a player belongs if the player enters (or exits) any one of those segments. If a player generates an event (e.g., via player activity), the USS engine 140 can perform a lookup or retrieval (from an appropriate database or distributed cache, such as Redis or the like) of the profile of the player who generated the event. The USS engine 140 can also perform a lookup or retrieval of all segments (both real-time and batch) for the player who generated the event (e.g., using the retrieved profile information of the player). If the player belongs to one or more segments associated with a triggered push notification, the USS engine 140 can set a game ID to the mobile game being played by the player or any other appropriate mobile game (e.g., the most-played mobile game of the day, week, month, etc.). Based on the retrieved information and game ID, the USS engine 140 can build an appropriate (triggered) push message for the player. The USS engine 140 can identify or otherwise determine the push notification service or other push provider to deliver the message, and then use the identified service to send the triggered push notification to the client device of the player. Once received by the client device, the triggered push notification can be configured to personalize or customize or cause the personalization or customization of the player experience in or associated with the mobile game.

In an embodiment, there may be a delay in identifying various characteristics and behaviors for new players (other than they are "new players") entering or joining a mobile game for the first time after installation. For example, it may take a period of time for each new player to sufficiently interact or engage with the mobile game before such characteristics and behaviors can be sufficiently identified. Situations such as this could create an initial delay in assigning new players to one or more segments. According to an embodiment, future players can be pre-segmented into one or more segments prior to installing and joining the mobile game or other initial event. In an embodiment, a plurality of segments can be pre-generated by the real-time segmentation engine 126, the batch segmentation engine 130, or a combination of both. Any suitable number of segments can be pre-generated according to some embodiments of the present invention. Each pre-generated segment can be based on any suitable combination of player characteristics and/or behaviors, and each pre-generated segment can be used to personalize the mobile game experience for a new player in any appropriate manner. Such pre-generated segments can be assigned to future players before they exist and join the mobile game so that various aspects of the player experience can be customized prior to the first time the player interacts or otherwise engages with the mobile game. In an embodiment, pre-generated segments can be associated with player identifications (IDs) that will exist and be allocated at some point in the future, where each player ID can be, for example, any suitable unique combination of numbers and/or letters or other appropriate unique identifier. The real-time segmentation engine 126 and/or the batch segmentation engine 130 can pre-allocate a plurality of player IDs and assign or otherwise associate one or more pre-generated segments with each pre-allocated player ID. Any suitable number of player IDs can be pre-allocated and any suitable number of segments can be pre-generated in such a manner.

As new players install and join a mobile game, each new player can be assigned one of the pre-allocated IDs, such as the next consecutive pre-allocated player ID, the lowest-numbered available pre-allocated player ID, or any appropriate one of the pre-allocated player IDs, for example, based on when the new player created their game account or other suitable criteria. Since there can be one or more pre-generated segments associated with each pre-allocated player ID, the new player can be immediately (or soon thereafter) assigned to and enter the one or more pre-generated segments associated with the pre-allocated player ID after joining the mobile game. In an alternative embodiment, each new player can be assigned to one or more pre-generated segments based on a correspondence between characteristics/behaviors of the new player and the characteristics/behaviors of the segment(s). For purposes of illustration and not limitation, a new player with a particular geographical location, device platform, and device OS version can be assigned to a pre-generated segment with identical or overlapping characteristics immediately (or soon thereafter) upon installing and joining the mobile game. In such an alternative embodiment, a new player can be assigned the player ID associated with the segment to which the new player has been assigned. If the new player has been assigned to multiple pre-generated segments, the new player can be assigned the player ID associated with, for example, the highest priority segment. According to some embodiments of the present invention, new players can be segmented immediately upon joining the mobile game (or soon thereafter), such as after creation of a game account, after completion of initial training or first-time experience within the mobile game, or at any other suitable point.

Figure 5:
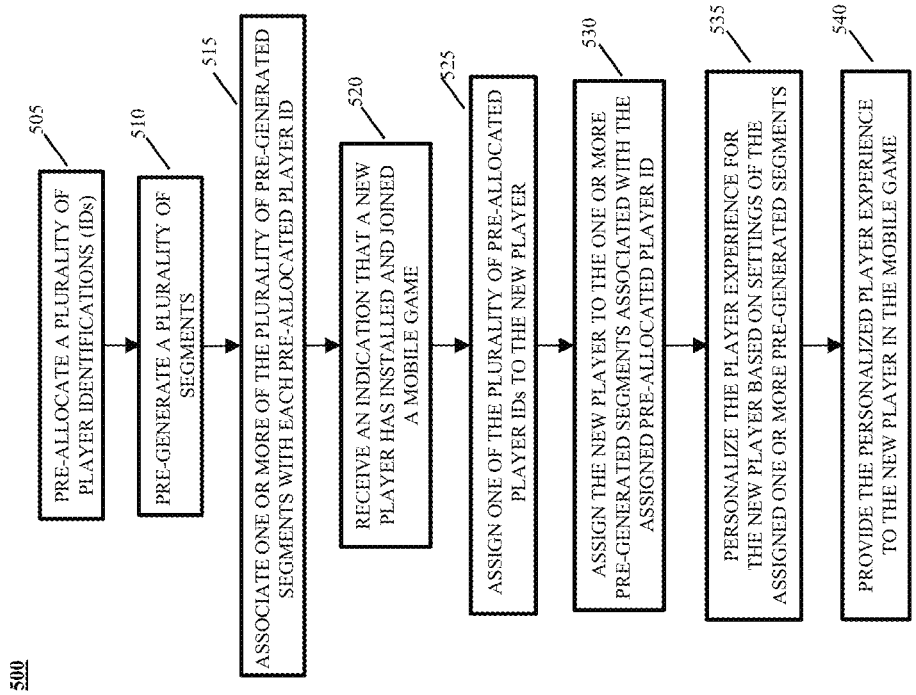
FIG. 5 is a flowchart of an example method of pre-segmenting users of a client application.

FIG. 5 is a block diagram illustrating an example method 500 of pre-segmenting users of a client application, in accordance with embodiments of the disclosure. In embodiments, the method 500 can be performed using a real-time process (e.g., using real-time segmentation engine 126 of FIG. 1), a batch process (e.g., using batch segmentation engine 130 of FIG. 1), or a combination of both. Merely for purposes of discussion and not limitation, the method 500 will refer to the batch segmentation engine 130 to illustrate various aspects of the present embodiment. However, the method 500 can be performed by the real-time segmentation engine 126, the batch segmentation engine 130, or a combination of both. At block 505, a plurality of player IDs can be pre-allocated, such as by, for example, the batch segmentation engine 130. Any suitable number of player IDs can be pre-allocated. At block 510, the batch segmentation engine 130 can pre-generate a plurality of segments. Any suitable number of segments can be pre-generated by the batch segmentation engine 130. At block 515, the batch segmentation engine 130 can associate one or more of the plurality of pre-generated segments with each pre-allocated player ID. At block 520, an indication or other appropriate notification can be received that a new player has installed and joined a mobile game. For example, the indication can be received when the new player creates a game account in the mobile game. In an embodiment, the indication can be received by the batch segmentation engine 130. At block 525, one of the plurality of pre-allocated player IDs can be assigned to the new player, such as the next consecutive pre-allocated player ID, the lowest-numbered available pre-allocated player ID, or any suitable one of the plurality of pre-allocated player IDs. In an embodiment, the batch segmentation engine 130 can assign the pre-allocated player ID to the new player, although the pre-allocated player ID can be assigned by any suitable process executing or otherwise operating in the server system 120 (e.g., a real-time process, a batch process, or a combination of both). At block 530, the batch segmentation engine 130 can assign the new player to the one or more pre-generated segments associated with the assigned pre-allocated player ID. At block 535, the batch segmentation engine 130 can personalize the player experience for the new player based on the settings of the assigned one or more pre-generated segments. At block 540, the personalized player experience can be provided to the new player in the mobile game. For example, the batch segmentation engine 130 can suitably modify the mobile game executing on the mobile device of the new player based on the settings of the assigned one or more pre-generated segments. After the initial assignment of pre-generated segment(s) for the new player, the player can be assigned to other (non-pre-generated) segments in real-time by the real-time segmentation engine 126 as the player continues to interact in and with the mobile game, for example, in accordance with the method 200 as illustrated in FIG. 2.

Any suitable aspect of the initial player experience in or associated with the mobile game can be updated, customized, modified, or otherwise personalized for the new player based on the pre-generated segment(s) to which the new player is added. For example, the real-time segmentation engine 126, the batch segmentation engine 130, or a combination of both can personalize any or all aspects of the graphical display of the mobile game (e.g., one or more graphical elements of the mobile game, such as any aspect of the "look and feel" of the graphical interface displayed by the mobile game), the information displayed within the mobile game, the features and functionality of the mobile games, and the like. Merely for purposes of illustration and not limitation, the real-time segmentation engine 126, the batch segmentation engine 130, or a combination of both can personalize the graphical display of the mobile game to display, for example, player incentives, special offers, advertisements or the like to the new player inside or within the mobile game. In embodiments, different player incentives, special offers, advertisements, or the like can be displayed to a new player in the mobile game based on the pre-generated segment(s) to which the new player is added. The types of personalization can be specified as part of the definition or associated settings of each pre-generated segment. For example, pre-segmentation can be used to customize and/or optimize initial or earlier aspects of the mobile game, such as a first-time user experience (FTUE). For purposes of illustration and not limitation, the pre-generated segment personalization settings can be, for example, a special LTO that is applicable for new players. In an embodiment, one or more special LTOs can be presented to the new player immediately or soon after the new player completes their FTUE in the mobile game.

Additionally or alternatively, pre-segmentation can be used to support testing (e.g., A/B testing or the like) of various aspects of a new player's onboarding experience in a mobile game. In an embodiment, pre-segmentation can be used to support testing and comparison of different initial configurations of user experiences against one another more quickly and efficiently. For example, A/B testing (or other suitable testing) can be performed within a new player's initial period of time in the mobile game (e.g., within the first few minutes of installing, joining, creating a mobile game account, etc.) based on the pre-generated segment(s) to which the new player is assigned. Consequently, pre-segmentation can provide the ability to run testing on different aspects of one or more new players' initial experiences in the mobile game, such as, for example, testing the effect of different LTOs at the same time across different new players. Such testing can be used, for example, to optimize the initial or first-time experience for new players in the mobile game.

Figure 6:
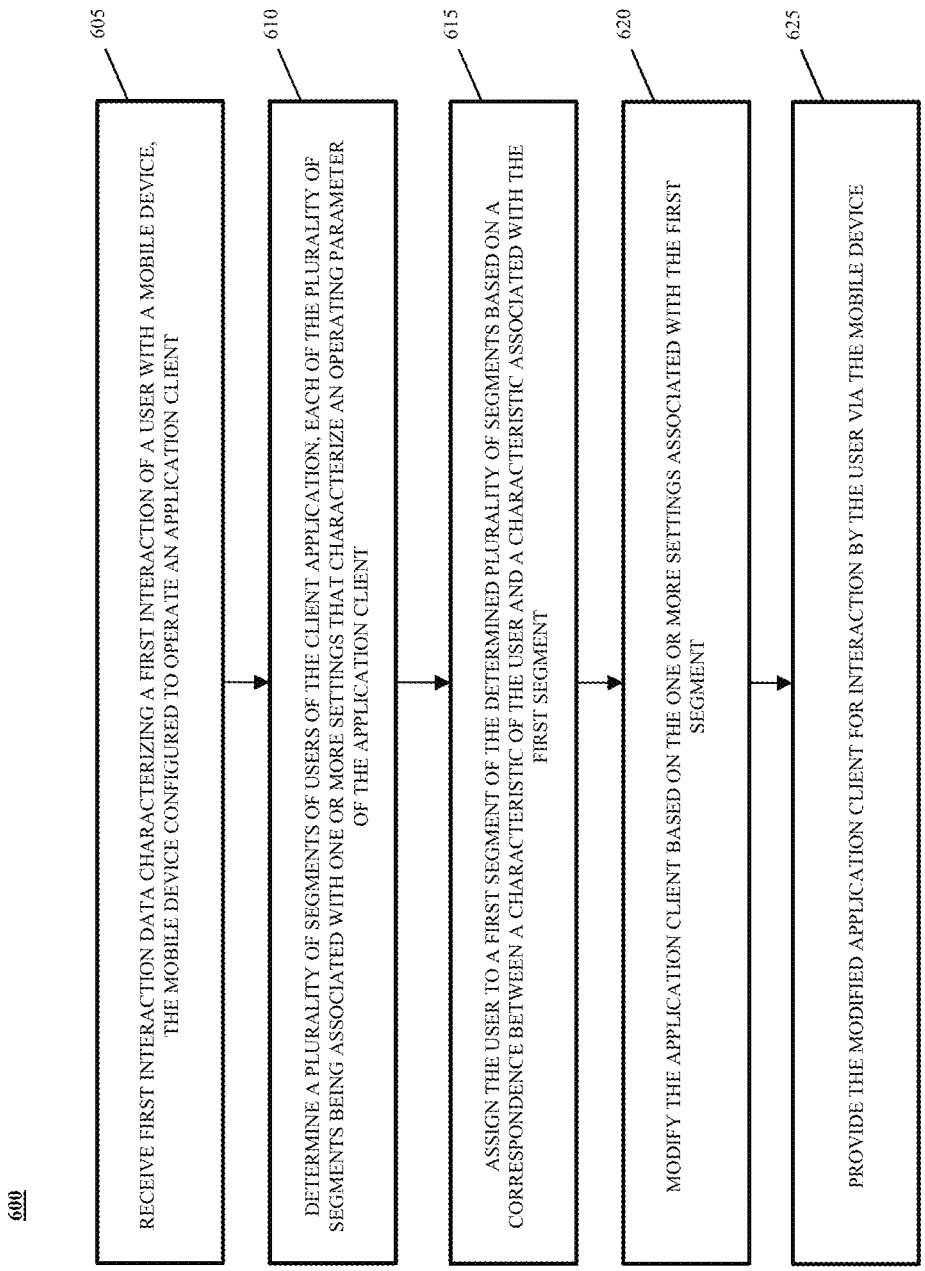
FIG. 6 is a flowchart of an example method of segmenting users of a client application.

FIG. 6 is a block diagram illustrating an example method 600 of segmenting users of a client application, in accordance with embodiments of the disclosure. In embodiments, the method 600 can be performed using a real-time process (e.g., using real-time segmentation engine 126 of FIG. 1), a batch process (e.g., using batch segmentation engine 130 of FIG. 1), or a combination of both. In addition, in embodiments, the method 600 can be used for real-time segmentation and/or for pre-segmentation of users of the client application. Merely for purposes of discussion and not limitation, the method 600 will refer to the real-time segmentation engine 126 to illustrate various aspects of the present embodiment. However, the method 600 can be performed by the real-time segmentation engine 126, the batch segmentation engine 130, or a combination of both.

At block 605, first interaction data characterizing a first interaction of a user with a mobile device configured to operate an application client can be received. For example, in some embodiments, the first interaction data can characterize the user's interaction or engagement with the client application. In some embodiments, the first interaction data can characterize a user's interaction with the mobile device outside of the client application. For example, such out-of-application user activity can include an ad click or other like activity outside of the client application. Thus, user interactions can be any suitable type of in-application or out-of-application information that is associated with actions, events, or other interactions generated by the user. In an embodiment, the first interaction data can be received by the real-time segmentation engine 126.

At block 610, a plurality of segments of users of the client application can be determined, and each of the segments can be associated with one or more settings that characterize an operating parameter of the application client. In embodiments, the plurality of segments can be predefined or generated dynamically, can be static or can change dynamically, can be of any suitable size (e.g., can be comprised of any appropriate number of users), and can each be associated with one or more user characteristics, behaviors, or the like. In an embodiment, the plurality of segments can be determined by the real-time segmentation engine 126.

At block 615, the real-time segmentation engine 126 can assign the user to a first segment of the determined plurality of segments based on a correspondence between a characteristic of the user and a characteristic associated with the first segment. For example, since each segment of the plurality of segments can be defined according to one or more attributes, the attributes of the user can be compared with the attributes defined for the plurality of segments to determine whether the user activity satisfies entry to one or more of the plurality of segments. In an embodiment, each of the determined plurality of segments can include a priority classification, and the user can be assigned to the first segment based on the included priority classification.

At block 620, the real-time segmentation engine 126 can modify the application client operating on the mobile device based on the one or more settings associated with the first segment. For example, in an embodiment, the real-time segmentation engine 126 can modify a graphical display of the application client based on the one or more settings associated with the first segment.

At block 625, the real-time segmentation engine 126 can provide the modified application client to the mobile device, and the user can interact with the modified application client via the mobile device.

In some embodiments, second interaction data characterizing a second interaction of the user with the mobile device can be received, and the user can be assigned to a second segment of the plurality of segments based on the received second interaction data. The modified application client can be further modified based on the one or more settings associated with the second segment, and the further-modified application client can be provided to the mobile device for the user's interaction with the further-modified application client via the mobile device. In some embodiments, the providing of the further-modified application client can include determining a push notification characterizing the further-modified application client and causing the push notification to be transmitted to the mobile device such that the mobile device is configured to operate the further-modified application client.

In some embodiments, characteristic data characterizing a population of one or more users of the application client can be received, and the one or more of the plurality of segments can be modified based on the received characteristic data. In some embodiments, the characteristic data can characterize an attribute that characterizes one or more behaviors of the population. In some embodiments, the characteristic data can characterize a criterion which characterizes a comparison between the attribute and a predetermined threshold that is based on a type of the attribute.

Figure 7:
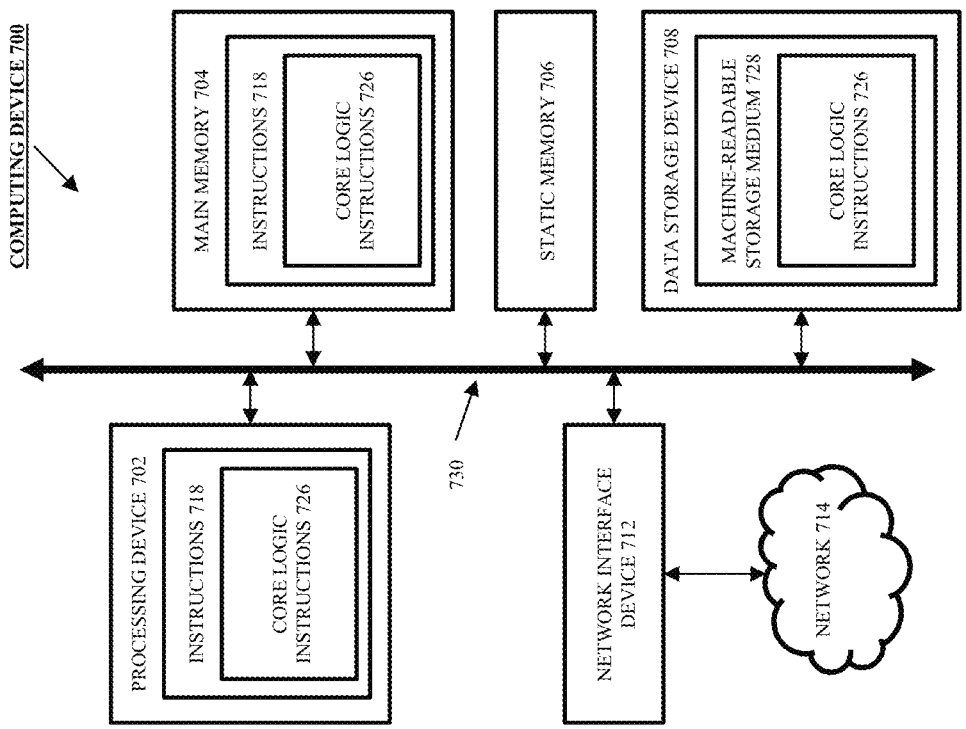
FIG. 7 is a block diagram of an example computing device that may perform one or more of the operations described herein, in accordance with the present embodiments.

FIG. 7 is a block diagram of an example computing device 700 that may perform one or more of the operations described herein, in accordance with the present embodiments. The computing device 700 may be connected to other computing devices in a LAN, an intranet, an extranet, and/or the Internet. The computing device 700 may operate in the capacity of a server machine in client-server network environment or in the capacity of a client in a peer-to-peer network environment. The computing device 700 may be provided by a personal computer (PC), a set-top box (STB), a server, a network router, switch or bridge, or any machine capable of executing a set of instructions (sequential or otherwise) that specify actions to be taken by that machine. Further, while only a single computing device 700 is illustrated, the term "computing device" shall also be taken to include any collection of computing devices that individually or jointly execute a set (or multiple sets) of instructions to perform the methods discussed herein.

The example computing device 700 may include a computer processing device 702 (e.g., a general purpose processor, ASIC, etc.), a main memory 704, a static memory 706 (e.g., flash memory or the like), and a data storage device 708, which may communicate with each other via a bus 730. The computer processing device 702 may be provided by one or more general-purpose processing devices such as a microprocessor, central processing unit, or the like. In an illustrative example, computer processing device 702 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. The computer processing device 702 may also comprise one or more special-purpose processing devices, such as an application specific integrated circuit (ASIC), a field programmable gate array (FPGA), a digital signal processor (DSP), network processor, or the like. The computer processing device 702 may be configured to execute the operations described herein, in accordance with one or more aspects of the present disclosure, for performing the operations and steps discussed herein.

The computing device 700 may further include a network interface device 712, which may communicate with a network 714. The data storage device 708 may include a machine-readable storage medium 728 on which may be stored one or more sets of instructions, e.g., instructions for carrying out the operations described herein, in accordance with one or more aspects of the present disclosure. Instructions 718 implementing core logic instructions 726 may also reside, completely or at least partially, within main memory 704 and/or within computer processing device 702 during execution thereof by the computing device 700, main memory 704 and computer processing device 702 also constituting computer-readable media. The instructions may further be transmitted or received over the network 714 via the network interface device 712.

While machine-readable storage medium 728 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media, magnetic media, and the like.

The subject matter described herein provides many technical advantages. For example, some implementations of the present invention can allow for modification and/or dynamic updating of client and server configuration parameters (e.g., system settings), which can enable dynamic and flexible control of client application operation. As such, some implementations of the present invention can provide for a better overall system experience. Additionally, some implementations of the present invention can improve the efficiency and utilization of computer processing and memory by grouping users into segments so that personalization or customization of the user experience can be managed at the segment level for large numbers of users, rather than managing the user experience for each user individually. Without grouping users into segments, managing individual user experiences would be practically impossible for client applications with, for instance, millions or tens of millions of users. For example, each segment can be comprised of a software component executing on computer hardware resources. Grouping users into segments can enable the same computer hardware resources (e.g., computer processing and memory) to be used for a large number of users (e.g., hundreds of thousands, millions, tens of millions, etc.), resulting in significant optimization of computer resource utilization. In some implementations of the present invention, pre-segmenting users can be less computer resource intensive than segmenting users in real-time (e.g., since a default user experience of future users can be pre-computed rather than performed on-the-fly). Thus, by pre-segmenting users, the efficiency and utilization of computer processing and memory can be improved dramatically, particularly for client applications with large or very large numbers of users.

Embodiments of the subject matter and the operations described in this disclosure can be implemented in digital electronic circuitry, or in computer software, firmware, or hardware, including the structures disclosed in this disclosure and their structural equivalents, or in combinations of one or more of them. Embodiments of the subject matter described in this disclosure can be implemented as one or more computer programs, i.e., one or more modules of computer program instructions, encoded on computer storage medium for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer processing device, a computer, a system on a chip, or multiple ones, or combinations, of the foregoing. A computer processing device may include one or more processors which can include special purpose logic circuitry, e.g., an FPGA (field programmable gate array) or an ASIC (application specific integrated circuit), a central processing unit (CPU), a multi-core processor, etc. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, procedural, or functional languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto optical disks, optical disks, solid state drives, or the like. However, a computer need not have such devices. Moreover, a computer can be embedded in another device, e.g., a smart phone, a mobile audio or media player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display) monitor or the like, for displaying information to the user and a keyboard and a pointing device, e.g., a mouse, a trackball, a touchpad, a stylus, or the like, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this disclosure can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), peer-to-peer networks (e.g., ad hoc peer-to-peer networks), and the like.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Reference throughout this disclosure to "one embodiment" or "an embodiment" means that a particular feature, structure, or characteristic described in connection with the embodiments included in at least one embodiment. Thus, the appearances of the phrase "in one embodiment" or "in an embodiment" in various places throughout this disclosure are not necessarily all referring to the same embodiment. In addition, the term "or" is intended to mean an inclusive "or" rather than an exclusive "or."

While this disclosure contains many specific implementation details, these should not be construed as limitations on the scope of any inventions or of what may be claimed, but rather as descriptions of features specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description of illustrated implementations of the invention is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method, comprising:
generating a plurality of user identifications for use with an application client operating on a plurality of mobile devices;
generating a plurality of segments for users of the application client, each of the plurality of segments being associated with one or more settings that characterize an operating parameter of the application client, and wherein each of the plurality of segments includes a priority;
associating one or more of the plurality of segments with each of the plurality of user identifications;
receiving first interaction data characterizing a first interaction of a user with the client application;
assigning one of the plurality of user identifications to the user;
assigning the user to a first segment of the plurality of segments based on a correspondence between the user identification assigned to the user and the user identification associated with the first segment and based on the priority of the first segment;
causing the application client to be modified based on the one or more settings associated with the first segment; and
causing the modified application client to be provided for interaction by the user via a mobile device of the user.

2. The method of claim 1, wherein the generating the plurality of user identifications and the associating the one or more of the plurality of segments with each of the plurality of user identifications occur prior to the receiving the first interaction data.

3. The method of claim 1, wherein the assigning the user to the first segment of the plurality of segments comprises:
determining the priority of the first segment is greater than a priority of each other segment of the plurality of segments associated with the user identification of the first segment.

4. The method of claim 1, further comprising:
receiving second interaction data characterizing a second interaction of the user with the client application;
assigning the user to a second segment of the plurality of segments based on the received second interaction data;
causing the modified application client to be modified based on the one or more settings associated with the second segment; and
causing the further-modified application client to be provided for interaction by the user via the mobile device of the user.

5. The method of claim 4, wherein the application client is modified by the one or more settings associated with the first segment or the one or more settings associated with the second segment based on the priorities of the first segment and the second segment.

6. The method of claim 1, wherein the one or more settings associated with the first segment cause a first-time user experience for the application client to be provided for interaction by the user via the mobile device of the user.

7. The method of claim 1, wherein the causing the application client to be modified comprises:
causing a push notification to be transmitted to the application client, wherein the push notification causes the application client to be modified based on the one or more settings associated with the first segment.

8. The method of claim 1, wherein at least one of the plurality of segments is associated with a time-to-live (TTL), and wherein the at least one of the plurality of segments expires after a predetermined time interval specified by the TTL.

9. The method of claim 1, wherein the application client comprises a competitive skill-based mobile game.

10. The method of claim 1, wherein each segment of the plurality of segments is associated with one or more rules for assigning users to and removing users from each segment.

11. A system, comprising:
at least one data processor; and
memory storing instructions that, when executed by the at least one data processor, cause the at least one data processor to perform operations comprising:
generating a plurality of user identifications for use with an application client operating on a plurality of mobile devices;
generating a plurality of segments for users of the application client, each of the plurality of segments being associated with one or more settings that characterize an operating parameter of the application client, and wherein each of the plurality of segments includes a priority;
associating one or more of the plurality of segments with each of the plurality of user identifications;
receiving first interaction data characterizing a first interaction of a user with the client application;
assigning one of the plurality of user identifications to the user;
assigning the user to a first segment of the plurality of segments based on a correspondence between the user identification assigned to the user and the user identification associated with the first segment and based on the priority of the first segment;
causing the application client to be modified based on the one or more settings associated with the first segment; and
causing the modified application client to be provided for interaction by the user via a mobile device of the user.

12. The system of claim 11, wherein the operation of generating the plurality of user identifications and the operation of associating the one or more of the plurality of segments with each of the plurality of user identifications occur prior to the operation of receiving the first interaction data.

13. The system of claim 11, wherein the operation of assigning the user to the first segment of the plurality of segments comprises:
determining the priority of the first segment is greater than a priority of each other segment of the plurality of segments associated with the user identification of the first segment.

14. The system of claim 11, wherein the operations further comprise:
receiving second interaction data characterizing a second interaction of the user with the client application;
assigning the user to a second segment of the plurality of segments based on the received second interaction data;
causing the modified application client to be modified based on the one or more settings associated with the second segment; and
causing the further-modified application client to be provided for interaction by the user via the mobile device of the user.

15. The system of claim 14, wherein the application client is modified by the one or more settings associated with the first segment or the one or more settings associated with the second segment based on the priorities of the first segment and the second segment.

16. The system of claim 11, wherein the one or more settings associated with the first segment cause a first-time user experience for the application client to be provided for interaction by the user via the mobile device of the user.

17. The system of claim 11, wherein the operation of causing the application client to be modified comprises:
causing a push notification to be transmitted to the application client, wherein the push notification causes the application client to be modified based on the one or more settings associated with the first segment.

18. The system of claim 11, wherein at least one of the plurality of segments is associated with a time-to-live (TTL), and wherein the at least one of the plurality of segments expires after a predetermined time interval specified by the TTL.

19. The system of claim 11, wherein the application client comprises a competitive skill-based mobile game.

20. A computer program product comprising a non-transitory machine readable medium storing instructions that, when executed by at least one programmable processor forming part of at least one computing system, cause the at least one programmable processor to perform operations comprising:

generating a plurality of user identifications for use with an application client operating on a plurality of mobile devices;

generating a plurality of segments for users of the application client, each of the plurality of segments being associated with one or more settings that characterize an operating parameter of the application client, and wherein each of the plurality of segments includes a priority;

associating one or more of the plurality of segments with each of the plurality of user identifications;

receiving first interaction data characterizing a first interaction of a user with the client application;

assigning one of the plurality of user identifications to the user;

assigning the user to a first segment of the plurality of segments based on a correspondence between the user identification assigned to the user and the user identification associated with the first segment and based on the priority of the first segment;

causing the application client to be modified based on the one or more settings associated with the first segment; and causing the modified application client to be provided for interaction by the user via a mobile device of the user.

* * * * *